US012729829B1

(12) United States Patent
Xu

(10) Patent No.: US 12,729,829 B1
(45) Date of Patent: Sep. 8, 2026

(54) PLASTIC DECORATIVE LAMP FRAME WITH ASSEMBLED STRUCTURE

(71) Applicant: Tong Xu, Linhai (CN)

(72) Inventor: Tong Xu, Linhai (CN)

( * ) Notice: Subject to any disclaimer, the term of this patent is extended or adjusted under 35 U.S.C. 154(b) by 0 days.

(21) Appl. No.: 19/449,906

(22) Filed: Jan. 15, 2026

(51) Int. Cl.
*F21V 1/02* (2006.01)
*F21V 17/00* (2006.01)
*F21V 17/06* (2006.01)
*F21V 17/08* (2006.01)

(52) U.S. Cl.
CPC .............. *F21V 1/02* (2013.01); *F21V 17/002* (2013.01); *F21V 17/007* (2013.01); *F21V 17/06* (2013.01); *F21V 17/08* (2013.01)

(58) Field of Classification Search
CPC . F21V 1/02; F21V 1/06; F21V 17/002; F21V 17/007; F21V 17/16; F21V 17/08
See application file for complete search history.

(56) References Cited

U.S. PATENT DOCUMENTS 5,422,487 A * 6/1995 Sauska .................... C02F 1/325 250/436
6,135,617 A * 10/2000 Lai ........................ F21V 17/007 362/396
10,161,582 B1 * 12/2018 Qiu ........................ F21V 7/0075
10,161,601 B1 * 12/2018 Chen .......................... F21S 6/00
10,161,602 B1 * 12/2018 Bleile ................... F21V 17/166
12,529,472 B1 * 1/2026 Xu ............................ F16B 2/12
2010/0097812 A1 * 4/2010 Cheng ........................ F21S 4/10 362/382
2021/0341135 A1 * 11/2021 Hale ..................... F21V 17/007

OTHER PUBLICATIONS

Spirit Star Christmas Center, Christmas Tree Ball Light, 20IN Foldable Metal Frame LED Sphere for Outdoor Garden, 200LED Hanging & Pathway Light with Hook & stake, UL Listed, Brown Frame, Warm White, https://www.amazon.com/Christmas-Hanging-Pathway-Foldable-Outdoor/dp/BOB468FXQL/, Jun. 15, 2022 (Year: 2022).*

* cited by examiner

*Primary Examiner* — James R Greece
*Assistant Examiner* — Michael Chiang
(74) *Attorney, Agent, or Firm* — JEEN IP LAW, LLC

(57) ABSTRACT

Provided is a plastic decorative lamp frame with an assembly structure, which includes a frame body, an upper fixing mechanism, and a lower fixing mechanism. The frame body includes a plurality of frame units, with installation parts at two ends of the frame units. The upper and/or lower fixing mechanisms adopt installation disk units, which are provided with a plurality of installation hole units. The installation hole units are hinged to the installation parts, allowing the plurality of frame units to swing and retract; the plastic decorative lamp frame further includes a main fixing disk, which is provided with a plurality of fixing grooves. An assembly structure is used, which saves transportation costs. When components are damaged, they can be replaced accordingly. The assembly process is simple and convenient, and the structure is firm and stable. A user can customize the installation to achieve a connection between multiple frames.

8 Claims, 7 Drawing Sheets

PLASTIC DECORATIVE LAMP FRAME WITH ASSEMBLED STRUCTURE

TECHNICAL FIELD

The present disclosure relates to the field of lamp frame technologies, and in particular, to a plastic decorative lamp frame with an assembled structure.

BACKGROUND

Decorative lights are common decorative tools in people's daily lives, often used to add atmosphere to people during festivals. Decorative lights are usually used together with frames to provide good protection and auxiliary decoration for decorative lights.

In existing decorative light frames, fixed frames are usually used. Although they are convenient to use, they are prone to damage during transportation, occupy a large space, and require overall replacement after damage. At the same time, the pattern of the frame is fixed, and users cannot customize the design according to their own needs, resulting in poor user experience.

Some other decorative light frames may also use assembled frames, which to some extent avoid the above problems, but they need to be disassembled and reassembled at the beginning and after each use, which is a cumbersome process and can also affect the user's experience.

SUMMARY

In response to the above issues, the present disclosure aims to provide a plastic decorative lamp frame that adopts an assembly structure. The assembly structure saves transportation costs, and when components are damaged, they can be replaced accordingly. The assembly process is simple and convenient, and the structure is firm and stable. A user can customize the installation of the frame components according to his actual needs, achieve a connection between multiple frames, and improve the overall aesthetics. After one assembly is completed, the frame can be retracted without disassembly and only needs to be re-opened and fixed for a next use. The process is simple and greatly improves the user's experience.

The technical problem solved by the present disclosure can be achieved by adopting the following technical solution: a plastic decorative lamp frame with an assembly structure, including: a frame body, an upper fixing mechanism, and a lower fixing mechanism, where the frame body includes a plurality of frame units, and one single frame unit is provided with installation parts at two ends, and the upper fixing mechanism and the lower fixing mechanism uses the first fixing mechanism or the second fixing mechanism, where the first fixing mechanism includes a first installation disk and a first fixing component, and the second fixing mechanism includes a second installation disk and a second fixing component, the first installation disk and/or the second installation disk uses an installation disk unit, where the installation disk unit is provided with a plurality of installation hole units arranged in a circumferential direction, and the installation hole units are hinged and installed with the installation part, so that the plurality of frame units are configured to swing and retract; where the plastic decorative lamp frame further includes a main fixing disk, and the main fixing disk is provided with a plurality of fixing grooves, one single fixing groove is installed in combination with one single frame unit to keep the plurality of frame units to be fixed after being opened.

In some embodiments of the present disclosure, the installation hole units include a plug-in hole part and a limit hole part that are interconnected, a shrinkage part is provided between the plug-in hole part and the limit hole part, a limit outer edge is provided at one end of the installation part, after passing through the plug-in hole part, the installation part enters the limit hole part through the shrinkage part, so that the limit outer edge and the installation hole units form a fixed connection.

In some embodiments of the present disclosure, the installation disk units are further provided with a fixing hole unit, and the fixing hole unit is configured to cooperate with the first fixing component or the second fixing component for installation.

In some embodiments of the present disclosure, the first fixing component includes a first fixing disk and a first fixing shaft, a limit protrusion is provided on the first fixing shaft, and the first fixing shaft penetrates the fixing hole unit, so that the limit protrusion and the installation disk unit form a fixed connection, and the first fixing disk covers ends of the plurality of frame units.

In some embodiments of the present disclosure, the second fixing component includes a second fixing disk, a second fixing shaft, and a locking part, the second fixing disk is provided with a second fixing hole, the second fixing shaft penetrates the fixing hole unit and the second fixing hole, and one end of the second fixing shaft is threaded with the locking part, so that the locking part presses the second fixing disk and the installation disk unit, the second fixing disk covers ends of the plurality of frame units.

In some embodiments of the present disclosure, the second fixing shaft is provided with a positioning part, and the second fixing disk is provided with a positioning groove; or the second fixing shaft is provided with a positioning groove, and the second fixing disk is provided with a positioning part; the positioning groove is installed in combination with the positioning part.

In some embodiments of the present disclosure, the second fixing shaft is further provided with a hook part.

In some embodiments of the present disclosure, the main fixing disk further includes a through hole section, and the second fixing shaft and the hook part pass through the through hole section.

In some embodiments of the present disclosure, after the frame body, the upper fixing mechanism, the lower fixing mechanism, and the main fixing disk are installed together, any spatial configuration among spherical, ellipsoidal, pear shaped, or rectangular shapes is formed.

Compared with the prior art, the present disclosure has the following beneficial effects: the present disclosure adopts an assembly structure, which saves transportation costs. When components are damaged, they can be replaced accordingly. The assembly process is simple and convenient, and the structure is firm and stable. A user can customize the installation of frame components according to actual needs, realize the connection between multiple frames, and improve overall aesthetics. After one assembly is completed, the frame can be folded and closed without disassembly and only needs to be re-opened and fixed for the next use. The process is simple and greatly improves the user's experience.

Numeral reference: 1—frame body, 10—frame unit, 101—installation part, 1011—limit outer edge, 2—first fixing mechanism, 21—first installation disk, 22—first fixing component, 221—first fixing disk, 222—first fixing shaft, 2221—limit protrusion, 3—second fixing mechanism, 31—second installation disk, 32—second fixing component, 321—second fixing disk, 3211—second fixing hole, 3212—positioning groove, 322—second fixing shaft, 3221—positioning part, 3222—hook part, 323—locking part, 4—installation disk unit, 41—installation hole unit, 411—plug-in hole part, 412—limit hole part, 413—shrinking part, 42—fixing hole unit, 5—upper fixing mechanism, 6—lower fixing mechanism, 7—main fixing disk, 71—fixing groove, 72—through hole section.

DESCRIPTION OF EMBODIMENTS

In order to make the technical means, creative features, objectives, and effects of the present disclosure easy to understand, the present disclosure will be further elaborated with specific illustrations.

In the description of the present disclosure, it should be understood that terms "one end", "other end", "outer side", "upper", "inner side", "horizontal", "coaxial", "central", "end", "length", "outer end" and other directional or positional relationships indicated are based on directional or positional relationships shown in the accompanying drawings, only for the convenience of describing the present disclosure and simplifying the description, and do not indicate or imply that the device or element referred to must have a specific orientation, be constructed and operated in a specific orientation, and therefore cannot be understood as a limitation of the present disclosure.

Figure 1:
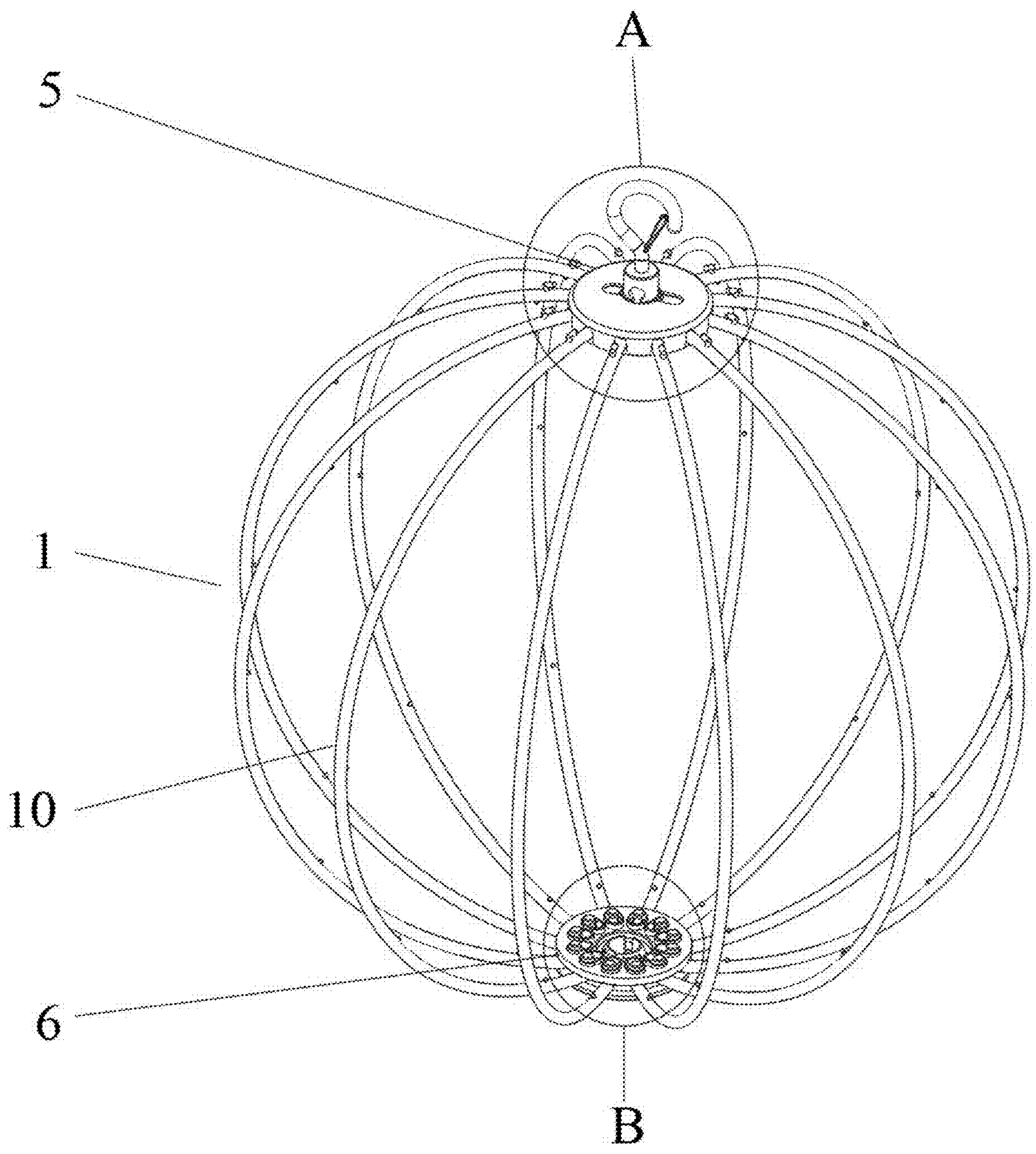
FIG. 1 is a schematic structural diagram of the present disclosure.
Figure 2:
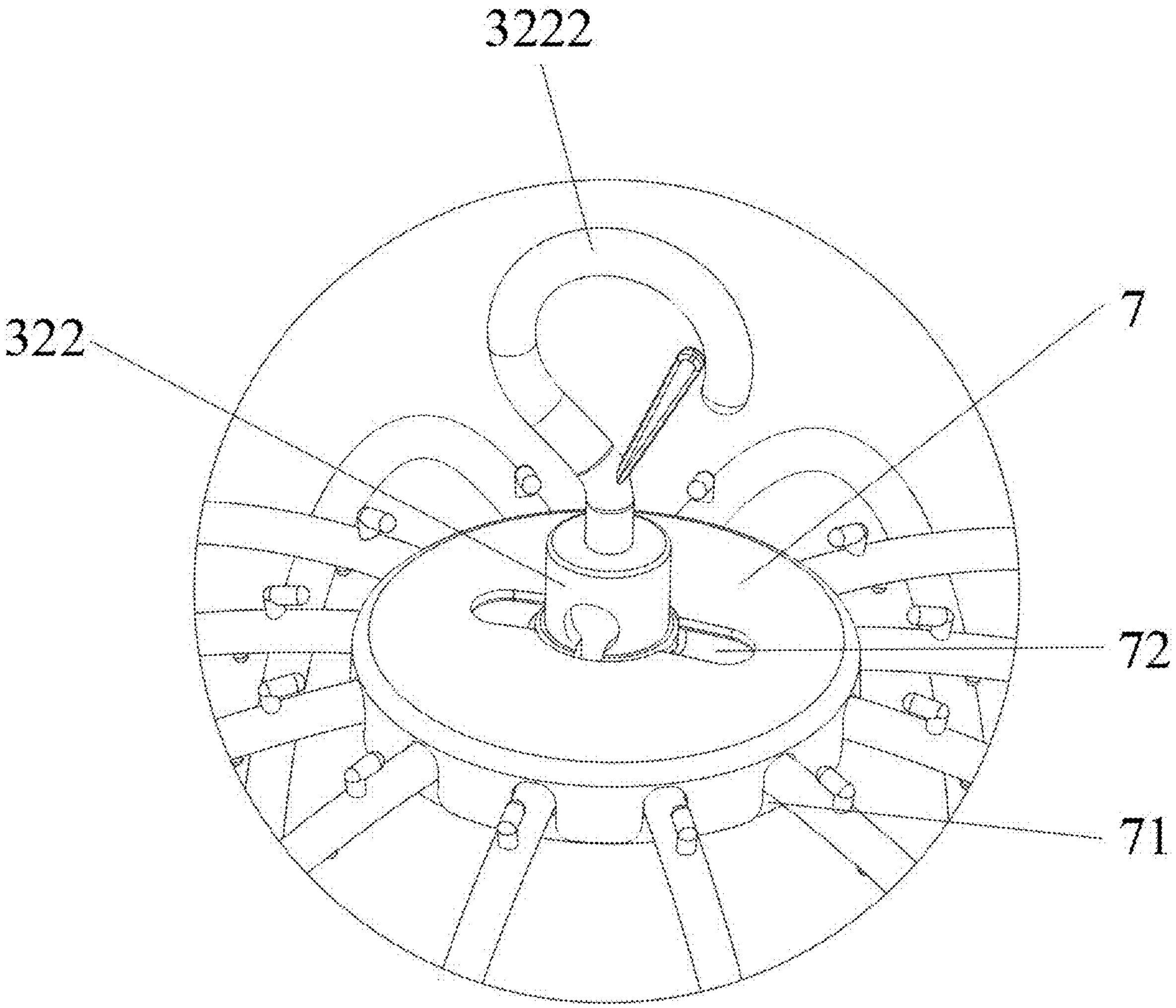
FIG. 2 is an enlarged view of part A in FIG. 1.
Figure 3:
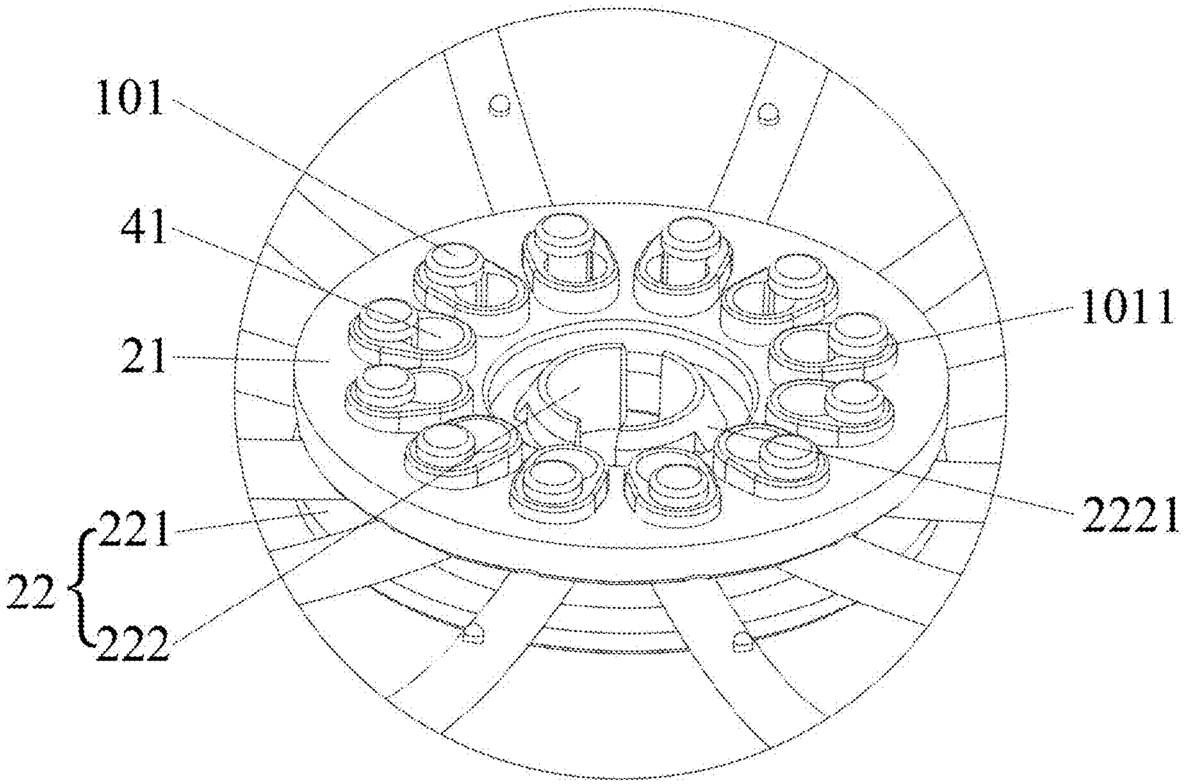
FIG. 3 is an enlarged view of part B in FIG. 1.
Figure 4:
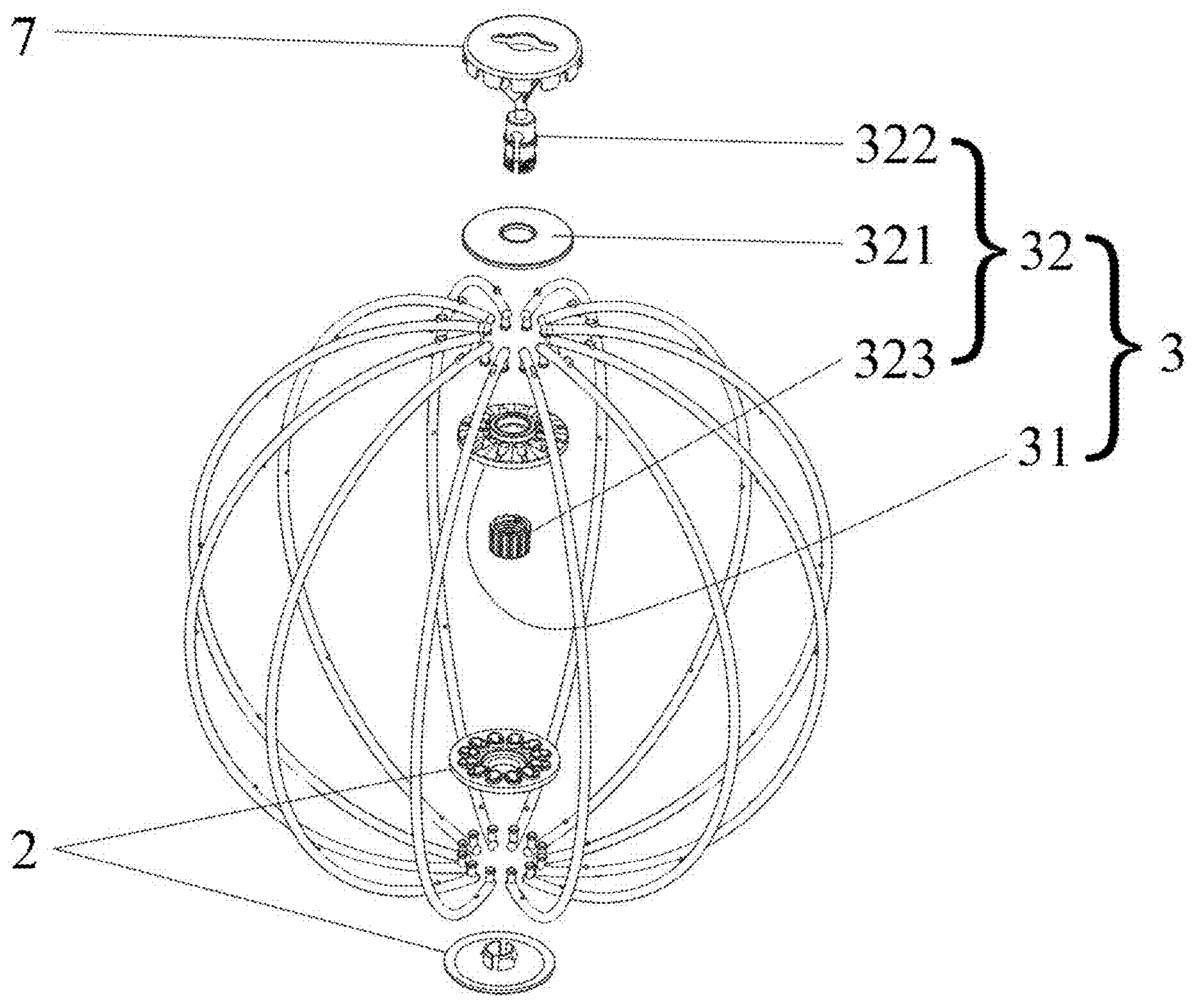
FIG. 4 is a schematic diagram of an explosive structure of the present disclosure.
Figure 5:
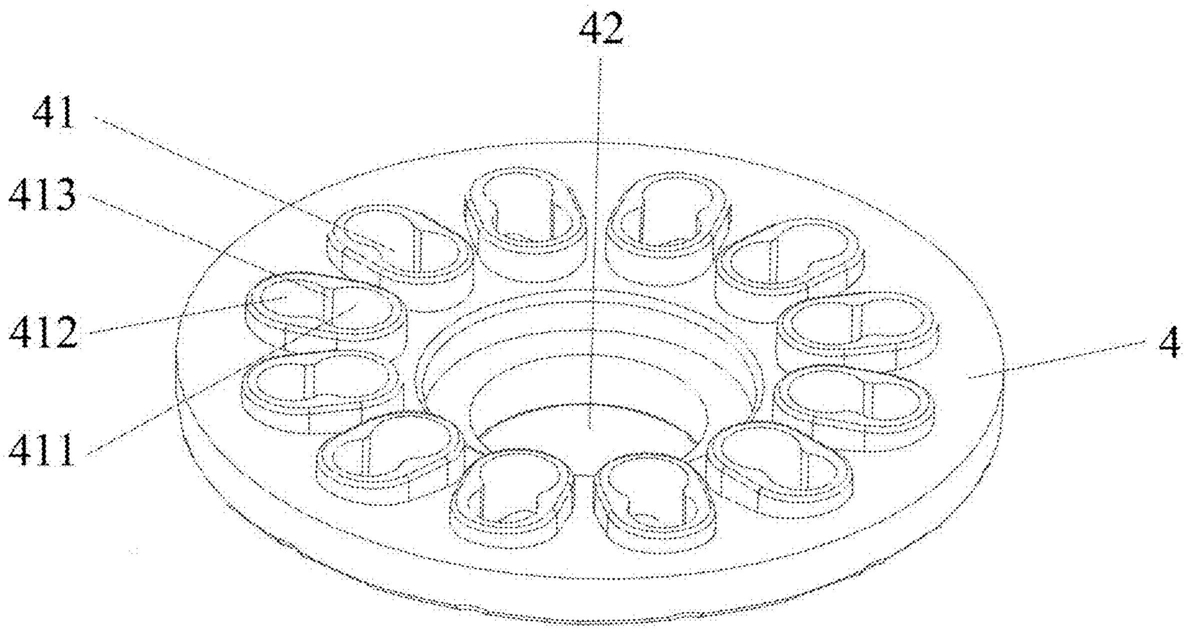
FIG. 5 is a schematic structural diagram of an installation disk unit.
Figure 6:
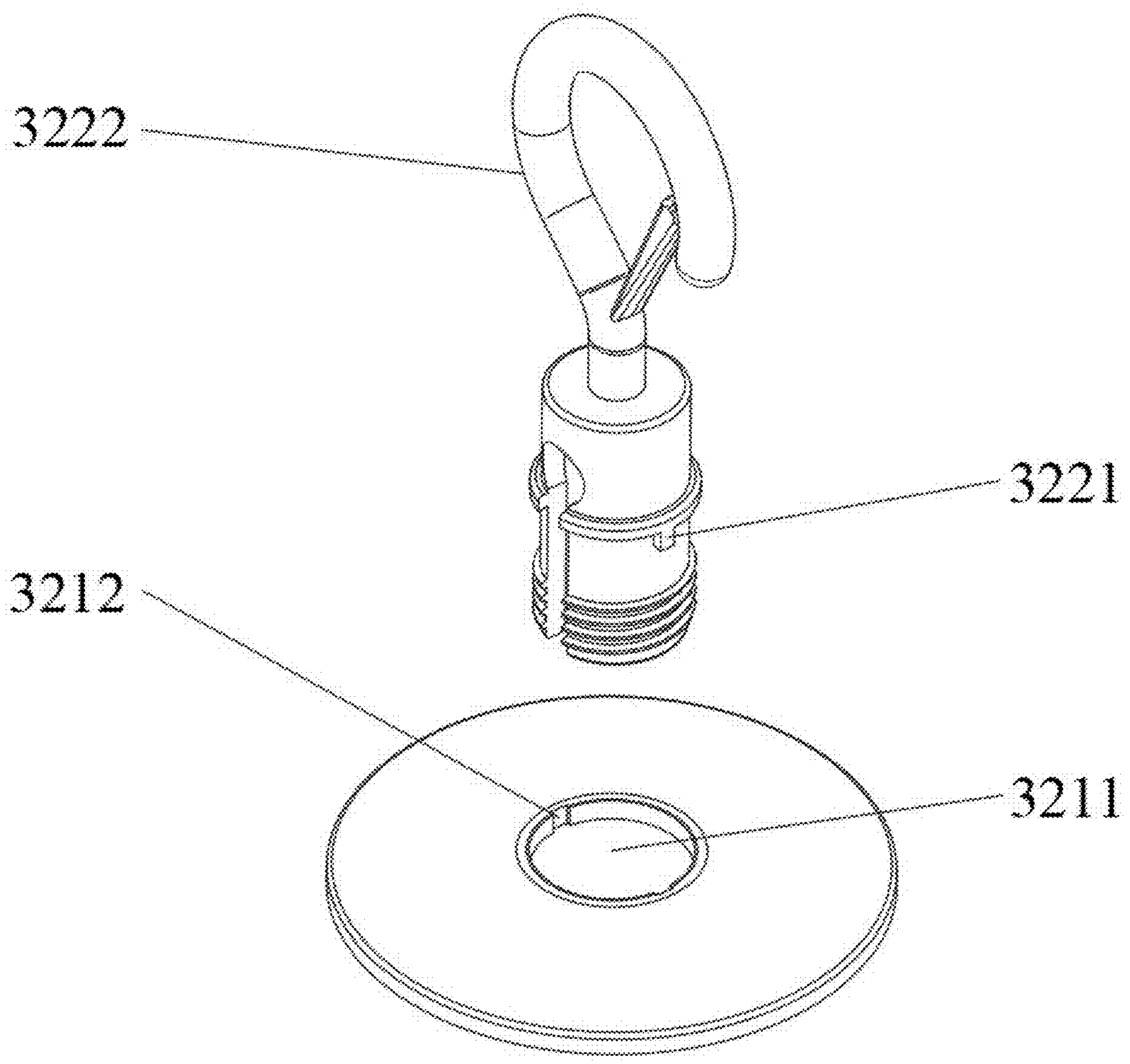
FIG. 6 is a schematic structural diagram of a second fixing shaft and a second fixing disk.
Figure 7:
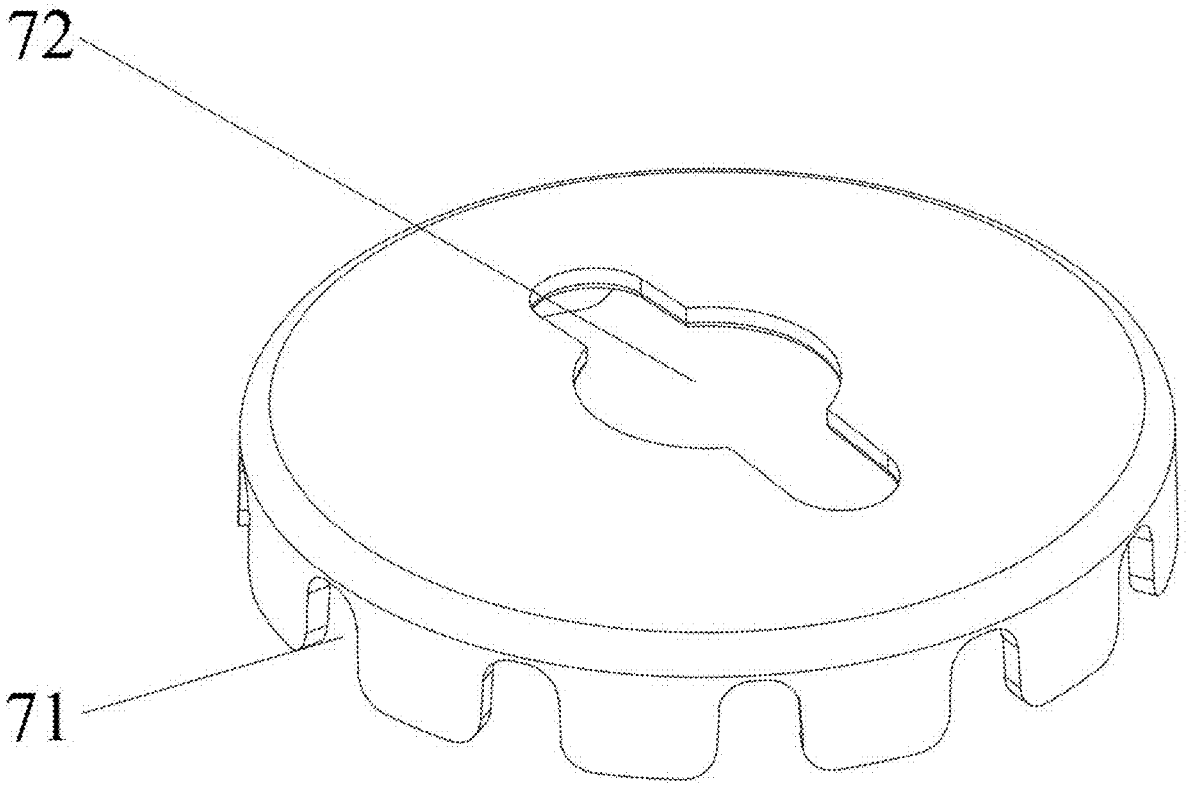
FIG. 7 is a schematic structural diagram of a main fixing disk.

As shown in FIGS. 1-7, an embodiment of the present disclosure discloses a plastic decorative lamp frame with an assembled structure, including a frame body 1, an upper fixing mechanism 5, and a lower fixing mechanism 6. The frame body 1 includes a plurality of frame units 10, and two ends of one single frame unit 10 are provided with installation parts 101. The upper fixing mechanism 5 and the lower fixing mechanism 6 adopt the first fixing mechanism 2 or the second fixing mechanism 3. The first fixing mechanism 2 includes a first installation disk 21 and a first fixing component 22, and the second fixing mechanism 3 includes a second installation disk 31 and a second fixing component 32. The first installation disk 21 and/or the second installation disk 31 adopt an installation disk unit 4, and the installation disk unit 4 is provided with a plurality of installation hole units 41 in a circumferential direction. The installation hole units 41 are hinged to the installation part 101, allowing the plurality of frame units 10 to swing and retract; the plastic decorative lamp frame further includes a main fixing disk 7, and the main fixing disk 7 is provided with a plurality of fixing grooves 71. One single fixing groove 71 is provided in combination with one single frame unit 10 to keep the plurality of frame units 10 to be fixed after being opened.

Based on the above installation structure, in an implementation mode, the upper fixing mechanism 5 adopts the second fixing mechanism 3, the lower fixing mechanism 6 adopts the first fixing mechanism 2, and both the first installation disk 21 and the second installation disk 31 adopt the installation disk unit 4. In an implementation mode, both the upper fixing mechanism 5 and the lower fixing mechanism 6 may use the second fixing mechanism 3 to achieve a connection between multiple decorative lamp frames.

Based on the above, the installation hole units 41 include a plug-in hole part 411 and a limit hole part 412 that are interconnected. A shrinking part 413 is provided between the plug-in hole part 411 and the limit hole part 412, where a diameter of the plug-in hole part 411 is larger than that of the installation part 101, and a diameter of the limit hole part 412 is smaller than that of the installation part 101. The plug-in hole part 411 and the limit hole part 412 are interconnected; one end of the installation part 101 is provided with a limit outer edge 1011. After the installation part 101 passes through the plug-in hole part 411, it enters the limit hole part 412 through the shrinking part 413, so that the limit outer edge 1011 interferes with the installation hole units 41 to achieve locking and limiting between the frame units 10 and the installation disk unit 4.

Based on the above, the installation disk unit 4 is further provided with a fixing hole unit 42, and the fixing hole unit 42 is configured to cooperate with the first fixing component 22 or the second fixing component 32 for installation.

Based on the above, the first fixing component 22 includes a first fixing disk 221 and a first fixing shaft 222. In this embodiment, the first fixing disk 221 and the first fixing shaft 222 are integrally formed, and a limit protrusion 2221 is provided on the first fixing shaft 222. The first fixing shaft 222 penetrates the fixing hole unit 42, so that the limit protrusion 2221 and the installation disk unit 4 form a fixed connection. In an implementation mode, the fixing hole unit 42 is provided with an inner edge to form a fixed connection with the limit protrusion 2221. The number of the limit protrusion 2221 is 2, and the first fixing disk 221 covers ends of the plurality of frame units 10 to press down the plurality of frame units 10 and strengthen the fixing effect.

Based on the above, the second fixing component 32 includes a second fixing disk 321, a second fixing shaft 322, and a locking part 323. The second fixing disk 321 is provided with a second fixing hole 3211, and the second fixing shaft 322 penetrates the fixing hole unit 42 and the second fixing hole 3211. One end of the second fixing shaft 322 is threaded with the locking part 323, so that the locking part 323 presses the second fixing disk 321 and the installation disk unit 4. The second fixing disk 321 covers ends of the plurality of frame units 10, thereby achieving a fixation between the frame units 10 and the installation disk unit 4 and strengthening the fixation effect.

Based on the above, in an implementation mode, the second fixing shaft 322 is provided with a positioning part 3221, and the second fixing disk 321 is provided with a positioning groove 3212. In an implementation mode, the second fixing shaft 322 can also be provided with a positioning groove 3212, and the second fixing disk 321 can be provided with a positioning part 3221. The positioning groove 3212 is provided in combination with the positioning part 3221 for easy installation, and at the same time, it can synchronously drive the decorative light frame to rotate when the second fixing shaft 322 is rotated.

In combination with the above, the second fixing shaft 322 is further provided with a hook part 3222. In an implementation mode, the hook part 3222 is further provided with a closed swing arm, and the closed swing arm can be opened first. When the hook part 3222 is installed in combination with another hook part 3222 or other suspension parts, the closed swing arm is closed to prevent the hook part 3222 from falling off, thereby strengthening the connection effect.

Based on the above, the main fixing disk 7 further includes a through hole section 72, and the second fixing shaft 322 and the hook part 3222 pass through the through hole section 72.

Based on the above, the frame body 1, the upper fixing mechanism 5, the lower fixing mechanism 6, and the main fixing disk 7 are installed together to form any spatial configuration among spherical, ellipsoidal, pear shaped, or rectangular shapes. In an implementation mode, it is a spherical spatial configuration.

Based on the above installation structure, in this embodiment, the number of the main fixing disk 7 is 1, and the main fixing disk 7 is installed in combination with the upper fixing mechanism 5. In an implementation mode, two main fixing disks 7 can also be assembled in combination with the upper fixing mechanism 5 and the lower fixing mechanism 6, respectively, to further strengthen the fixing effect after the plurality of frame units 10 are opened. After using, all main fixing disks 7 are simply removed to swing and retract the plurality of frame units 10.

The present disclosure adopts an assembly structure, which saves transportation costs. When the components are damaged, they can be replaced accordingly. The assembly process is simple and convenient, and the structure is firm and stable. A user can customize the installation of the frame components according to his actual needs, realize the connection between multiple frames, and improve the overall aesthetics. After one assembly is completed, the frame can be folded without disassembly and only needs to be re-opened and fixed for the next use. The process is simple and greatly improves the user's experience.

The above is only the preferred embodiment of the present disclosure and does not limit the invention in any form. Any simple modifications, equivalent changes or modifications made to the above embodiments based on the technical principles of the present disclosure still fall within the scope of the technical solution of the present disclosure.

What is claimed is:

1. A plastic decorative lamp frame with an assembly structure, comprising: a frame body, an upper fixing mechanism, and a lower fixing mechanism, wherein the frame body comprises a plurality of frame units, and one single frame unit is provided with installation parts at two ends, and the upper fixing mechanism and the lower fixing mechanism uses a first fixing mechanism or a second fixing mechanism, wherein the first fixing mechanism comprises a first installation disk and a first fixing component, and the second fixing mechanism comprises a second installation disk and a second fixing component, the first installation disk and/or the second installation disk uses an installation disk unit, wherein the installation disk unit is provided with a plurality of installation hole units arranged in a circumferential direction, and the installation hole units are hinged and installed with the installation part, so that the plurality of frame units are configured to swing and retract;

wherein the plastic decorative lamp frame further comprises a main fixing disk, and the main fixing disk is provided with a plurality of fixing grooves, one single fixing groove is installed in combination with one single frame unit to keep the plurality of frame units fixed after being opened, wherein the installation disk unit is further provided with a fixing hole unit, wherein the first fixing component comprises a first fixing disk and a first fixing shaft, a limit protrusion is provided on the first fixing shaft, and the first fixing shaft penetrates the fixing hole unit, so that the limit protrusion and the installation disk unit form a fixed connection, and the first fixing disk covers ends of the plurality of frame units.

2. The plastic decorative lamp frame with an assembly structure according to claim 1, wherein the installation hole units comprise a plug-in hole part and a limit hole part that are interconnected, a shrinkage part is provided between the plug-in hole part and the limit hole part, a limit outer edge is provided at one end of the installation part, after passing through the plug-in hole part, the installation part enters the limit hole part through the shrinkage part, so that the limit outer edge and the installation hole units form a fixed connection.

3. The plastic decorative lamp frame with an assembly structure according to claim 2, wherein the fixing hole unit is configured to cooperate with the first fixing component or the second fixing component for installation.

4. The plastic decorative lamp frame with an assembly structure according to claim 3, wherein the second fixing component comprises a second fixing disk, a second fixing shaft, and a locking part, the second fixing disk is provided with a second fixing hole, the second fixing shaft penetrates the fixing hole unit and the second fixing hole, and one end of the second fixing shaft is threaded with the locking part, so that the locking part presses the second fixing disk and the installation disk unit, the second fixing disk covers ends of the plurality of frame units.

5. The plastic decorative lamp frame with an assembly structure according to claim 4, wherein the second fixing shaft is provided with a positioning part, and the second fixing disk is provided with a positioning groove; or the second fixing shaft is provided with a positioning groove, and the second fixing disk is provided with a positioning part; the positioning groove is installed in combination with the positioning part.

6. The plastic decorative lamp frame with an assembly structure according to claim 5, wherein the second fixing shaft is further provided with a hook part.

7. The plastic decorative lamp frame with an assembly structure according to claim 6, wherein the main fixing disk further comprises a through hole section, and the second fixing shaft and the hook part pass through the through hole section.

8. The plastic decorative lamp frame with an assembly structure according to claim 1, wherein after the frame body, the upper fixing mechanism, the lower fixing mechanism, and the main fixing disk are installed together, any spatial configuration among spherical, ellipsoidal, pear shaped, or rectangular shapes is formed.

* * * * *